United States Patent
Stacy et al.

(10) Patent No.: US 9,055,767 B2
(45) Date of Patent: Jun. 16, 2015

(54) FOOD COATING APPARATUSES, SYSTEMS, AND METHODS

(71) Applicant: John Bean Technologies Corporation, Chicago, IL (US)

(72) Inventors: Robert M. Stacy, Sandusky, OH (US); Andrew A. Johnson, Sandusky, OH (US); Keith A. Gildenmeister, Victory, OH (US)

(73) Assignee: John Bean Technologies Corporation, Chicago, IL (US)

( * ) Notice: Subject to any disclaimer, the term of this patent is extended or adjusted under 35 U.S.C. 154(b) by 5 days.

(21) Appl. No.: 13/747,358

(22) Filed: Jan. 22, 2013

(65) Prior Publication Data

US 2013/0323376 A1    Dec. 5, 2013

Related U.S. Application Data

(60) Provisional application No. 61/589,798, filed on Jan. 23, 2012, provisional application No. 61/589,383, filed on Jan. 22, 2012.

(51) Int. Cl.
| | |
|---|---|
| *A23P 1/08* | (2006.01) |
| *B05C 19/00* | (2006.01) |
| *B05C 19/06* | (2006.01) |
| *A23G 3/20* | (2006.01) |
| *A23L 1/00* | (2006.01) |

(52) U.S. Cl.
CPC ............... *A23P 1/082* (2013.01); *B05C 19/008* (2013.01); *B05C 19/06* (2013.01); *A23G 3/2076* (2013.01); *A23L 1/005* (2013.01)

(58) Field of Classification Search
CPC ...... A23L 1/005; A23P 1/082; A23G 3/2076; B05C 19/008; B05C 19/06
USPC ............ 118/13, 16, 24, 30, 308, 312; 99/494, 99/450.1
See application file for complete search history.

(56) References Cited

U.S. PATENT DOCUMENTS

| | | | | |
|---|---|---|---|---|
| 3,186,358 | A | * | 6/1965 | Archer ............................ 118/16 |
| 3,759,218 | A | * | 9/1973 | Korstvedt ........................ 118/18 |
| 5,139,801 | A | * | 8/1992 | deJesus Montemayor et al. ............................. 426/274 |

FOREIGN PATENT DOCUMENTS

| | | |
|---|---|---|
| DE | 467 160 C | 10/1928 |
| DE | 2141 372 A1 | 3/1973 |
| DE | 32 48 749 A1 | 7/1984 |
| GB | 2 337 191 A | 11/1999 |

OTHER PUBLICATIONS

International Search Report and Written Opinion mailed Jun. 24, 2013, issued in corresponding International Application No. PCT/US2013/022596, filed Jan. 22, 2013, 9 pages.

* cited by examiner

*Primary Examiner* — Laura Edwards
(74) *Attorney, Agent, or Firm* — Christensen O'Connor Johnson Kindness PLLC

(57) ABSTRACT

A coating system (20) includes a conveyor system (22), a coating distribution assembly (24), and a coating adherence system (26). The coating material (M) may be recycled via a coating collection and return system (30). The coating distribution assembly (24) includes a container (64) for receiving and distributing the coating using a coating distribution roller (74). The roller (74) has a plurality of longitudinal channels (78) extending along the length of the roller to receive the coating material and apply the coating material onto food products by rotation of the distribution roller. A coating distribution device distributes the material metered by the coating distribution roller onto the food products.

21 Claims, 11 Drawing Sheets

FOOD COATING APPARATUSES, SYSTEMS, AND METHODS

CROSS-REFERENCES TO RELATED APPLICATIONS

This application claims the benefit of U.S. Provisional Application No. 61/589,383, filed Jan. 22, 2012, and U.S. Provisional Application No. 61/589,798, filed Jan. 23, 2012, the disclosures of which are hereby expressly incorporated by reference in their entirety in the present application.

BACKGROUND

The application of food coating to food products is a common practice in the food industry and used in many different food preparation processes. In an industrial scale production line, the continuous application of food coatings, for example, breading, flour, or another type of powdered or fine granular of coating material, poses challenges particularly when the coating material has high adhesion properties or a high moisture level, for example, in the range of about 10 to about 25% moisture content. In some cases, the moisture level of the coating material may be low to start, but it increases over time as it continuously contacts food products that have high moisture content. In that regard, the food products (or a batter coating on the food products, if battered) may transfer moisture to the coating material as the food products and coating material recirculate together through a coating machine.

In cases of high adhesion properties or high moisture level, there is an increased tendency for bridging, clumping, and clogging of the coating material, leading to flow interruptions or inconsistencies that are undesirable in continuous coating application processes. Such flow interruptions not only decrease the system through-put, but also may create a variance in the visual, texture, weight, and/or flavor aspects of the coated food products. As a result of such interruptions, the product must often be rejected, discarded, or sold at lower prices, resulting in significant losses for the food processor.

Therefore, there exists a need for improvements in food product coating for continuous and consistent coating results, particularly when the coating material has high adhesion properties or a high moisture level.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A food coating system includes a conveyor system and a coating distribution system positioned to distribute coating material to foods disposed on the conveyor system. The coating distribution system includes a coating distribution roller and at least one coating distribution device for distributing the coating material to the food products.

In accordance with a further aspect of the present disclosure, the coating distribution device is located adjacent the coating distribution roller. In addition, the coating distribution device includes a screen and a cover. The coating distribution device also includes a plurality of holes through which the coating material travels. Such holes have a geometry selected from slots, holes, squares, diamond and polygon shapes. A plurality of fingers extend outwardly adjacent the plurality of holes.

In accordance with a further aspect of the present disclosure, the coating distribution roller includes a plurality of longitudinal channels for receiving and dispensing the coating material.

In accordance with a further aspect of the present disclosure, a coating distribution device includes a vibratory device. The vibratory device has a configuration selected from the group consisting of a squirrel cage, a pervious belt, and a plurality of spokes.

In accordance with a further aspect of the present disclosure, the food coating system also includes at least one sifting device. The sifting device includes a sifting conveyor.

In accordance with a further aspect of the present disclosure, the coating distribution system also includes a container for containing the coating material. The container supplies coating material to the coating distribution system.

In accordance with the present disclosure, a method for coating food products with a fine or granular coating material is provided. The method includes positioning the food products for coating, and distributing the coating material on the food products. The distribution of the coating material on the food products includes rotating a roller above the food products, wherein the roller has a plurality of longitudinal channels for receiving and distributing the coating material on the food products.

In accordance with a further aspect of the present disclosure, the distribution of coating material on the food products includes using a sprinkling assembly to further process the coating material before distributing the coating material to the food products.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
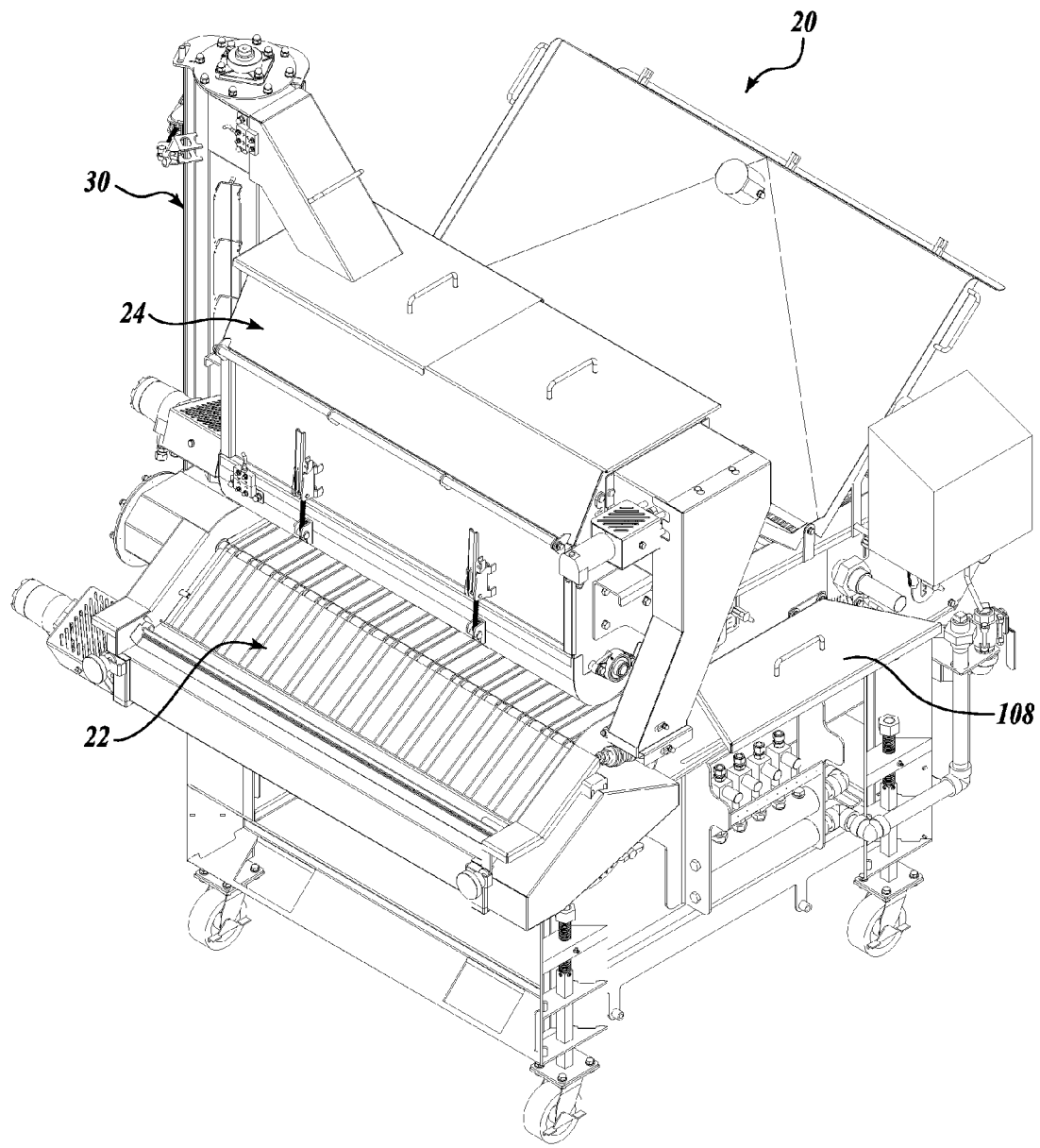
FIG. 1 is an isometric view of a coating system in accordance with embodiments of the present disclosure.

Embodiments of the present disclosure are generally directed for food coating systems, apparatuses, and methods. In particular, embodiments of the present disclosure may be directed to coating or breading food products at varying conditions, such as coating moisture, coating volumes, and food product through-put rates. Referring to FIGS. 1-5, a coating system 20 in accordance with one embodiment of the present disclosure is shown. The coating system 20 generally includes a conveyor system 22, a coating distribution assembly 24, and a coating adherence system 26. To recycle unused coating material M, the coating system 20 may further include a coating collection and return system 30.

Embodiments of the present disclosure may be directed to the application of food coatings, for example, breading, flour, or another type of powdered or fine granular of coating material, for food products. The coating material may be applied as a pre-dusting or as a final breading, for example, after a battering process. Moreover, the embodiments described herein allow for precise volume control of the amount of coating material to be applied to the food products.

The moisture content of the coating material may be high. Moisture content is typically in the range of about 2 to about 5% in standard breading applications. Therefore, a high moisture breading or coating application may have a moisture content in the range of about 5 to about 25%. The inventors found, however, that at about 23%, the coating material can start to create clogs and material bridges, and at about 25%, the coating material becomes more dough-like. In another embodiment, the coating material has a moisture content in the range of about 10 to about 17%. In another embodiment, the coating material has a moisture content in the range of about 10 to about 25%. In another embodiment, the coating material has a moisture content of greater than or equal to about 17%. It should be appreciated, however, that embodiments of the present disclosure are also directed to powdered or fine granular coating materials having a range a relatively low moisture content in the range of about 0 to about 10%.

Figure 4:
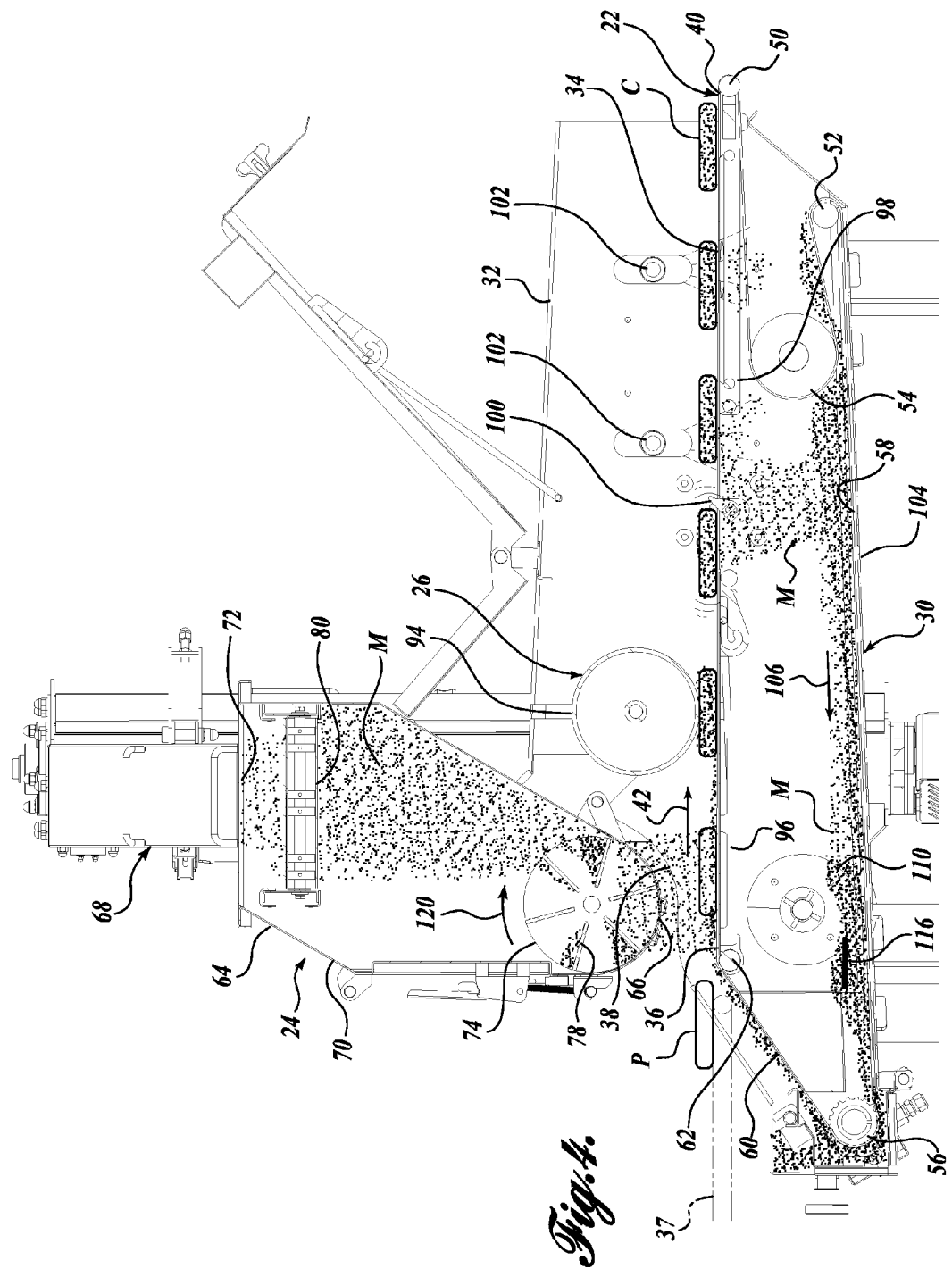
FIG. 4 is a side view of a portion of the coating system of FIG. 1, wherein flow paths of food products and coating material are shown.

Referring to FIG. 4, the conveyor system 22 includes a conveyor belt 34, such as a pervious conveyor belt, for moving food products P and coating material M through the coating system 20. In the illustrated embodiment, the conveyor system 22 is disposed within housing 32. Food products P enter the conveyor system 22 by being received on the belt 34 at the product infeed 36 to the coating system 20. Food products P may be received on the belt 34 from a transfer belt 37 or any other suitable method of transferring the products to the belt 34. After being received, the food products P travel along a coating section 38 of the path of the belt 34 (as indicated by arrow 42), wherein coating material M is applied to the top surfaces of the food products P from the coating distribution assembly 24.

After the food products P have been coated, the coated food products C continue through the coating adherence system 26, and then are released from the belt 34 at the product outfeed 40, for example, to another transfer belt (not shown) or any other suitable method of transferring the coated food products C from the belt 34. At the product outfeed 40, the belt 34 returns to the product infeed 36 via return rollers 50 and 52, a slack tightening roller 54, and a belt drive shaft 56. During the return section 58, the belt 34 travels though the coating return system 30. At the belt drive shaft 56, the belt travels upward along an incline section 60 and returns to the product infeed 36 and infeed roller 62.

As mentioned above, coating material M is applied to the top surfaces of the food products P from the coating distribution assembly 24. Still referring to FIG. 4, the coating distribution assembly 24 generally includes a container 64 for receiving and distributing coating. In the illustrated embodiment, the container is a hopper container; however, it should be appreciated that other types of containers, such as bins, are also within the scope of the present disclosure. Moreover, the coating distribution assembly 24 need not include a container and may be distributed directly from a coating feed source.

In the illustrated embodiment, the hopper system includes a hopper loading system 68 and a hopper chamber 70 having an upper hopper infeed 72 and a lower coating distribution roller 74. The hopper chamber 70 is positioned to distribute coating material M across the width of the conveyor belt 34 and is mounted just above the coating section 38 of the path of the conveyor belt 34. As seen in the illustrated embodiment, coating material M is fed into the hopper chamber 70 by the hopper loading system 68 (see also FIGS. 2 and 3) at the hopper infeed 72, and travels into the coating distribution roller 74.

The coating distribution roller 74 is a rotating roller (as indicated by rotation arrow 120 in FIG. 4) having a plurality of channels 78 to create a positive drive for the coating material M inside the hopper chamber 70 at different conditions. In the illustrated embodiment, channels 78 are shown as longitudinal channels extending along the length of the roller 74. The rotation of the roller 74 positively carries and drives coating material M in the concavities defined by the channels 78. As the concavities turn and reach their lowest point in rotation, they turn in an upside down configuration and dump coating material M onto the food products P. By adjusting the rotation speed of the roller 74, the rate of discharge of the coating material M from the hopper chamber 70 can be adjusted. The direction of rotation of the coating distribution roller 74 may also be adjusted from clockwise to counter clockwise. The roller 74 may be driven by an electric or hydraulic motor or other means.

Figure 2:
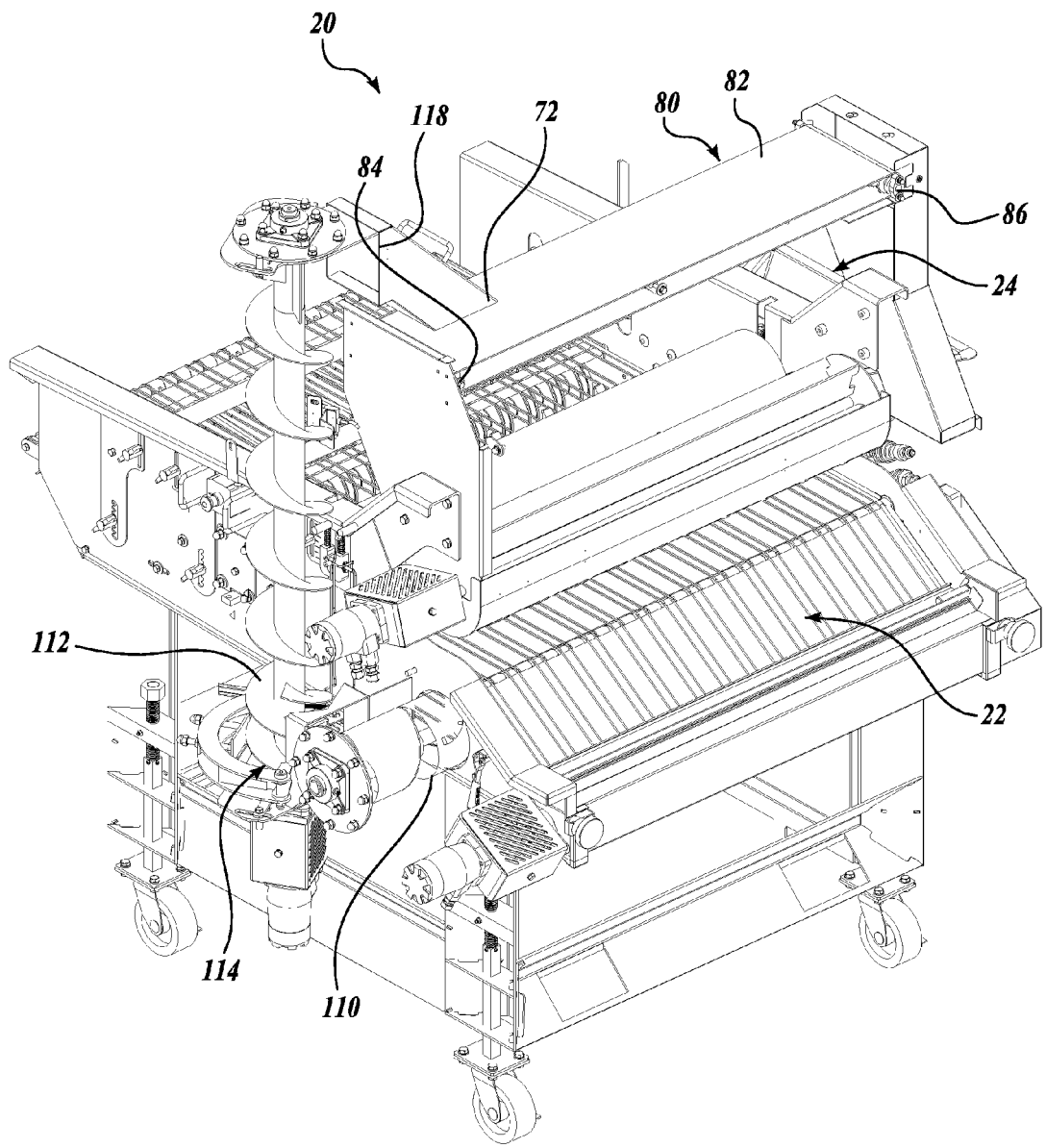
FIGS. 2 and 3 are respective front and back isometric views of the coating system of FIG. 1 with some protective covers removed so that inner components of the system are visible.
Figure 3:
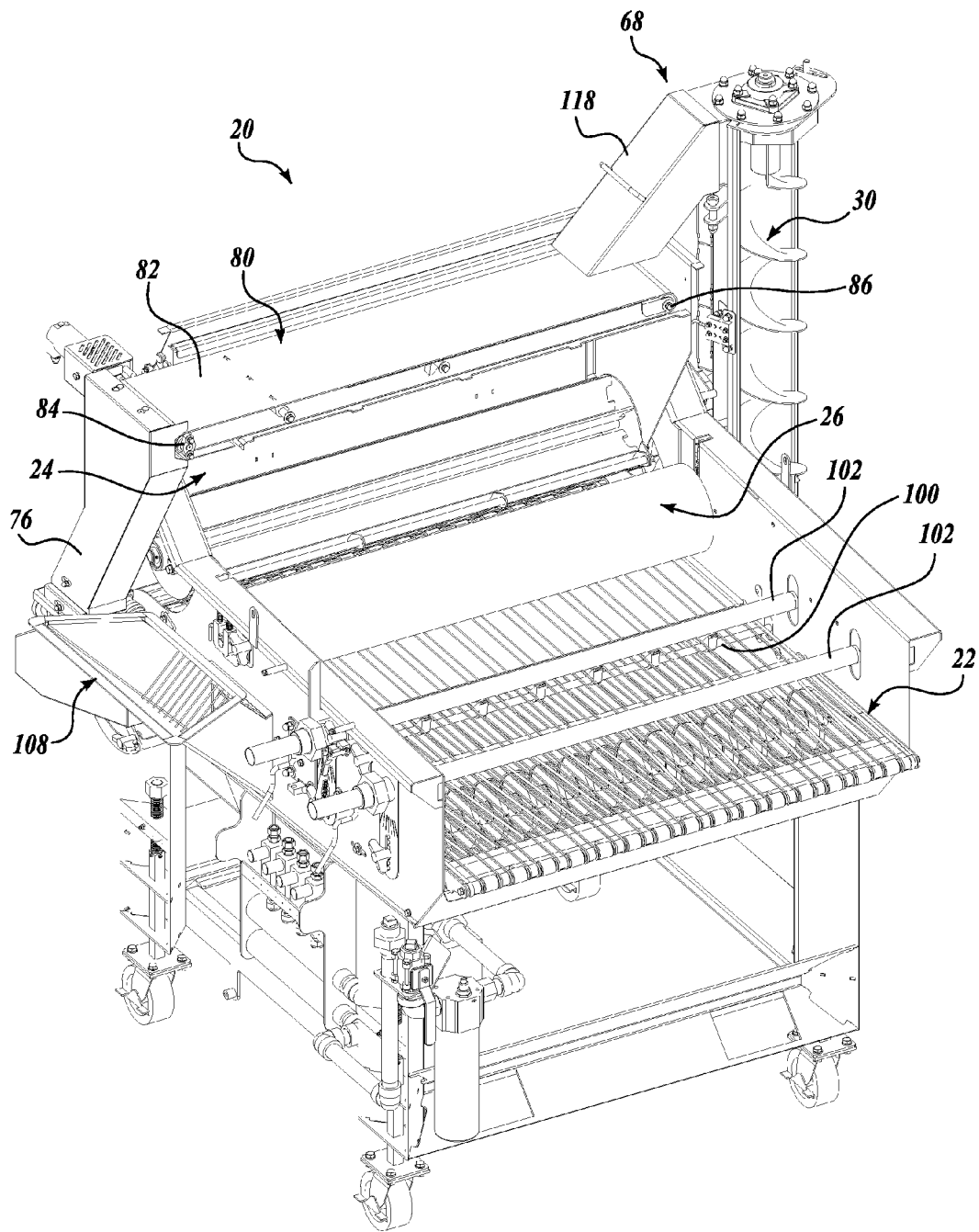

The coating distribution assembly 24 may further include an optional sifting assembly 80 located near the hopper infeed 72 to sift the coating material M prior to feeding it to the coating distribution roller 74. As can be seen in FIGS. 2 and 3, the sifting assembly 80 includes a pervious continuous conveyor belt system. In that regard, pervious belt 82 continuously rotates around end rollers 84 and 86 to sift the infeed coating material M being fed to the hopper chamber 70. The sifting assembly 80 can be used to sift out contaminants, clumps, and remnant product pieces from the coating material M as it is discharged into the hopper infeed 72 by the hopper loading system 68. The sifted contaminants may be discharged into a clump chute 76 (see FIG. 3) located at the end of assembly opposite hopper loading system 68, which may be periodically emptied by the user.

Figure 5:
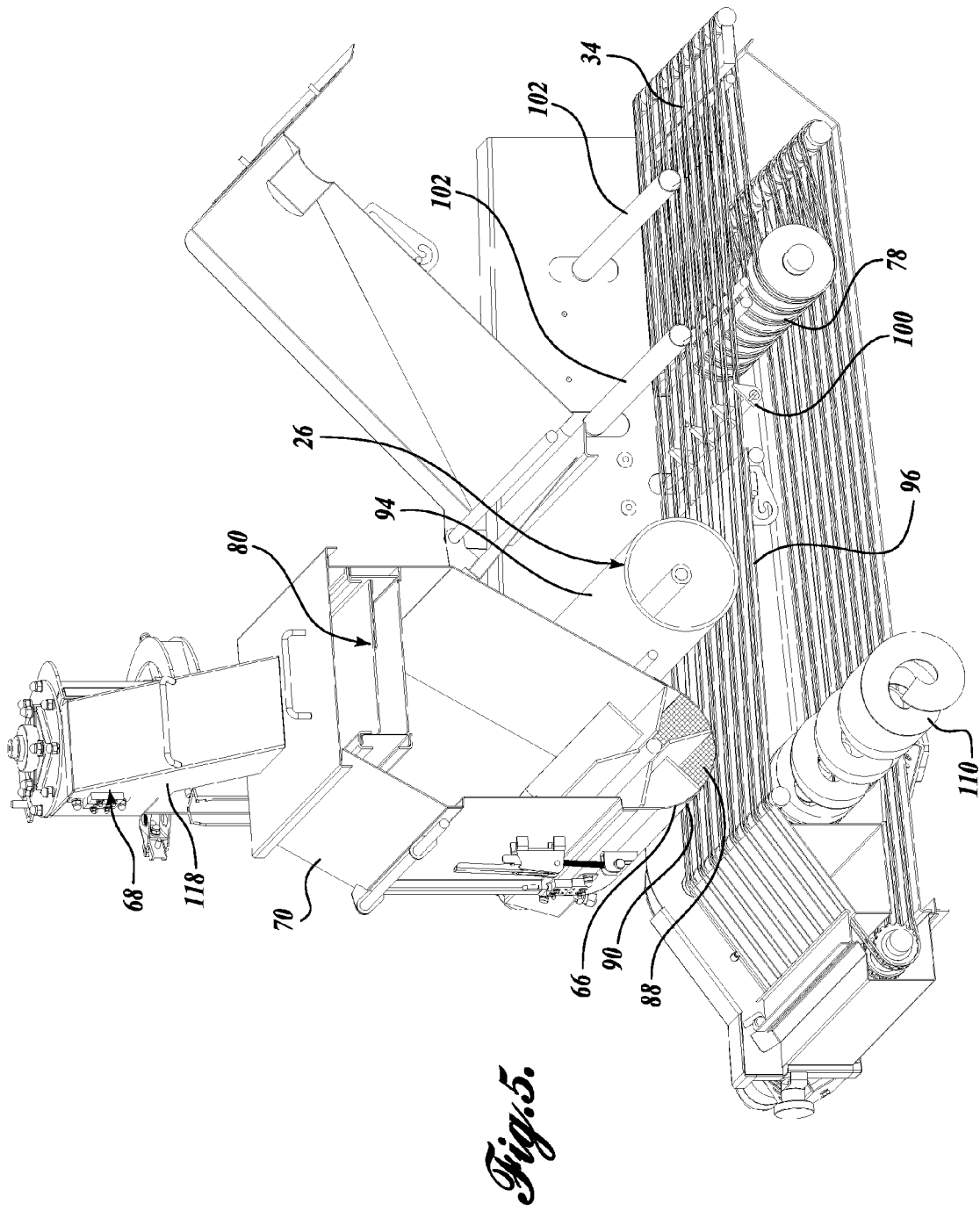
FIG. 5 is an isometric view of the portion of a coating system of FIG. 4.
Figure 6:
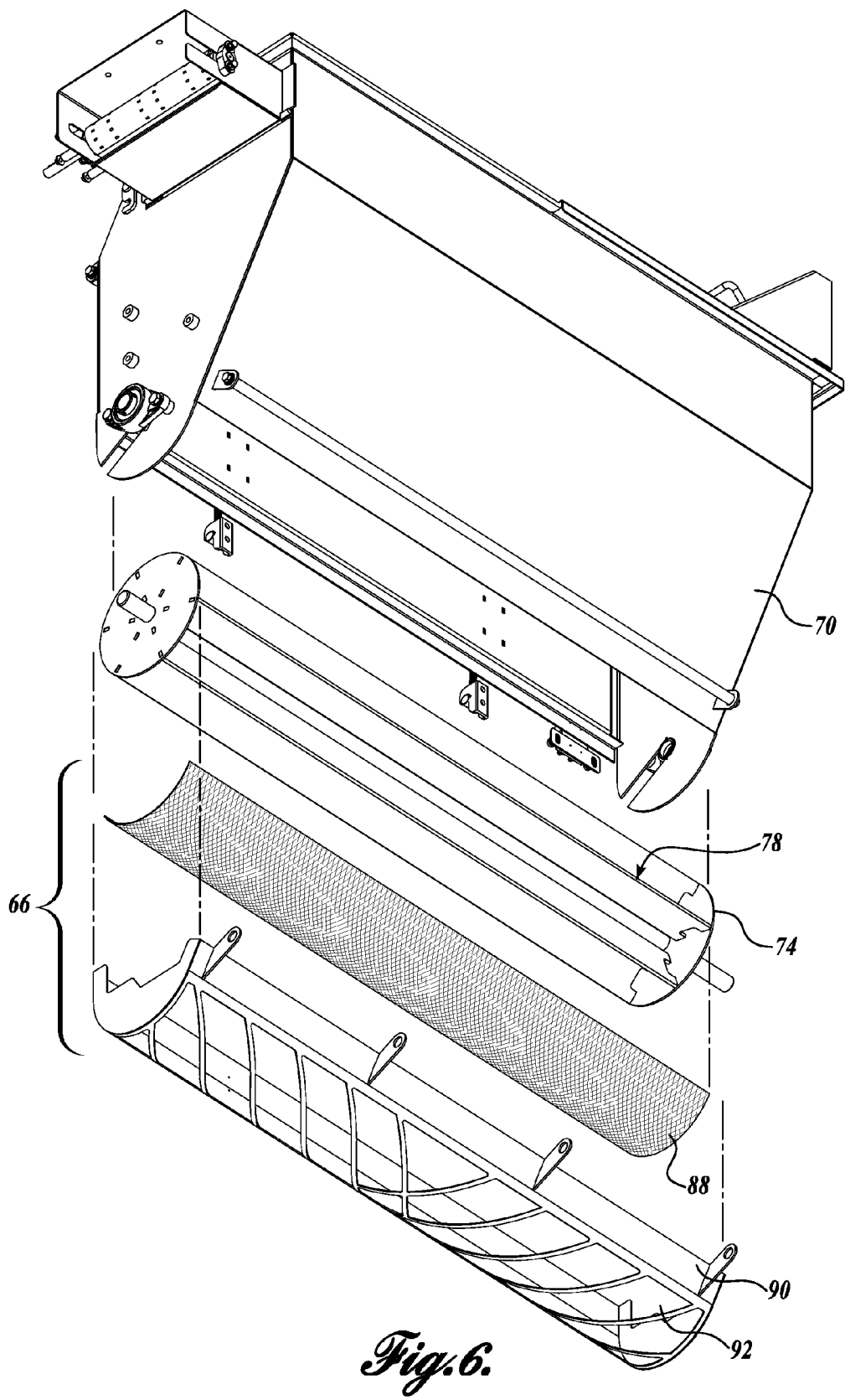
FIG. 6 is an exploded isometric view of the coating distribution assembly of the coating system of FIG. 1.

Referring to FIGS. 5 and 6, alternatively, or in addition to the sifting assembly 80, the coating distribution assembly 24 may include a sprinkling assembly 66. In the illustrated embodiment, the sprinkling assembly 66 is shown as including an optional screen 88 and an optional outlet cover 90, both located at the bottom of the hopper chamber 70 beneath the coating distribution roller 74. The sprinkling assembly 66 is designed to further break clogs, and material bridges are designed to create a continuous coarse sprinkle of coating material M for the food products P. Although shown as two discrete parts, it should be appreciated, that the screen 88 and outlet cover 90 may be integrated into one part, for example, laser cut from a piece of sheet metal (see e.g., the sprinkling assembly 766 shown in FIG. 13). Depending on the sprinkling application, the screen 88 may be sized for fine or larger sized sprinkling, for example, in the range of about 0.02 inches to about 0.5 inches.

As can be seen in FIG. 6, the screen 88 and outlet cover 90 are both rolled or otherwise formed into a partial cylindrical shape to match the outer diameter of the coating distribution roller 74 mounted near the outlet of the hopper chamber 70. The screen 88 has a mesh or is perforated with multiple small holes to provide a sprinkling function. The cover 90 provides structural support for the screen 88, which may be formed from thin gauge sheet metal and may not have enough stiffness to hold its shape without support. The positive drive of the coating distribution roller 74 in combination with the sprinkling assembly 66 assist in providing more even and consistent coating material M to the food products P.

The outlet cover 90 is designed to hold the screen 88 in place. The outlet cover 90 may also be used without the screen for processing coating materials with high moisture content or larger particulate size that would not easily flow through a screen 88. For example, the moisture content of the coating material M may be in the range of about 10 to about 25 percent. In the illustrated embodiment of FIG. 6, the outlet cover 90 includes a plurality of slots 92 that are arranged in an angled polygonal pattern that converges at the longitudinal midpoint of the cover. Alternate embodiments of the outlet cover 90 may include other geometrical arrangements, for example, a plurality of squares, holes, diamond shapes, other polygonal shapes, or any opening geometry that allows the coating material M to sieve through the outlet cover to create a sprinkling function. For safety reasons, the slots 92 are usually sized and shaped to prevent the ingress of operator's fingers into the hopper chamber 70. The outlet cover 90 may be configured as a hinged door for user access into the hopper chamber 70 or to replace a worn out screen 88.

In addition to the coating material M that falls onto the food products P from the coating distribution system 24, the conveyor belt 34 also carries coating material M to the product infeed 36, as can been seen in FIG. 4. Therefore, the contact surfaces on the conveyor belt 34 transfer coating material M to the underside of the food products P as they are received on the belt 34. In that regard, referring to FIGS. 4 and 5, the conveyor system 22 includes an underlying support plate 96 positioned directly below the belt 34 at the product infeed 36. The support plate 96 extends from the product infeed 36 to a location between the product infeed 36 and the product outfeed 40. With a volume of coating material M on the support plate 96, a layer of coating material M will also form on the contact surfaces of the conveyor belt 34. The distribution of coating material M to the hopper chamber 70 and the conveyor belt 34 will be described in greater detail below.

After the food products C have been coated on the top and bottom surfaces with coating material C, the conveyor belt 34 carries the food products C to the coating adherence system 26. As seen in FIGS. 4 and 5, the coating adherence system 26 generally includes a pressure roller 94 and support plate 96 located under a portion of the coating section 38 of the path of the belt 34. The pressure roller 94 and the support plate 96 work together to compress there between the coated food product C as it travels along the conveyor belt 34, thereby increasing the coating pickup or adherence on both the topside and the underside of the food product C.

After compression and coating adherence, excess coating material M is removed from the coated food products C and the belt 34 and returned to the coating return system 30. In that regard, excess coating material M may be removed by vibrating the belt 34 or blowing air on the belt, or using both methods. As seen in FIGS. 4 and 5, the coating system 20 includes a vibration device 100 and one or more blowing devices 102 that are located after the end of the support plate 96, where an open belt support guides the belt 34. The vibration and blowing devices 100 and 102 remove coating material M from the coated food products C and the belt 34 that did not adhere to the food products C. Because the belt 34 is pervious and the vibration and blowing devices are positioned after the support plate 96 in the coating section 38 of belt 34, the coating material M falls through the belt to collect in the support pan 104 at the bottom of the housing 32. In the illustrated embodiment, the vibration device 100 includes a vibrator shaft and vibrator blocks for vibrating the belt 34. The blowing devices 102 are shown as blow off tubes.

Referring to FIG. 4, after excess material M has been removed from the coated food products C and the belt 34, the coated food products C are discharged from the food coating system 20 at the product outfeed 40.

The coating return system 30 will now be described in greater detail. As discussed above, excess coating material M is removed from the belt 34 following the coating adherence system 26. As can be seen in FIG. 4, the coating material M passes through the pervious belt 34 and collects on the return section 58 of the belt 34, which is supported by a support pan 104. After enough coating material M collects and mounds on the support pan 104, it begins to form a layer on the belt 34, such that the belt 34 carries the coating material M along the support pan 104 in the direction indicated by arrow 106. In addition to recycled coating material M, new coating material M may be added to the coating return system 30 at the coating feeder port 108 (see FIGS. 1 and 3). In FIG. 1, the coating feeder port 108 is shown as covered, and in FIG. 3, the coating feeder port 108 is shown as uncovered. As can be seen in the illustrated embodiment of FIG. 3, the coating feeder port 108 may be an inclined chute to assist in the delivery of the new coating material M to the return system 30.

Referring to FIGS. 4 and 5, as the coating material M travels with the belt 34 along the support pan 104, it is received by a first auger 110. In the illustrated embodiment, the first auger 110 is a cross-feed auger having an axis perpendicular to the travel direction of the conveyor 34. The first auger 110 transports the coating material M in a spiral path to deposit the coating material M at the base of a second auger 112 in a transition housing 114 (see FIG. 2).

Now referring to FIG. 2, the transition housing 114 connects the first auger 110 to a second auger 112 to allow transference of coating material from the coating return system 30 to the coating distribution system 24. In that regard, the second auger 112 is a substantially vertical auger that transports the coating material M from the transition housing 114 in a spiral path to deposit the coating material M at the infeed 72 to the coating distribution system 24. As coating material exits the second auger 112 into the discharge chute 118 and the infeed 72 to the hopper chamber 70, the coating material M restarts its path through the food coating process.

Returning to FIG. 4, in addition to the return of coating material M to the hopper infeed 72, a portion of coating material M also returns on the belt 34 as it rounds the drive shaft 56 and returns to the product infeed 36. The volume of coating material M returned through drive shaft 56 is controlled by adjusting the gate 116. As mentioned above, this layer of coating material M on the contact surfaces of the conveyor belt 34 transfers coating material M to the food products P as they are received on the belt 34.

Referring to FIGS. 7-12B, other apparatuses or accessories may be used with the coating system, as described and shown in FIGS. 1-6, to further disperse and distribute the coating material M that flows out of the hopper to help ensure a fine, even, and consistent layer at all times, independent of operating conditions, such as coating moisture, coating volumes, and food product through-put rates. In that regard, alternate embodiments of the coating distribution system are provided. The alternate embodiments are substantially the same as the embodiment described and shown in FIGS. 1-6, however, with differences regarding the coating distribution assemblies at the outlet of the hopper chamber 70.

Figure 7:
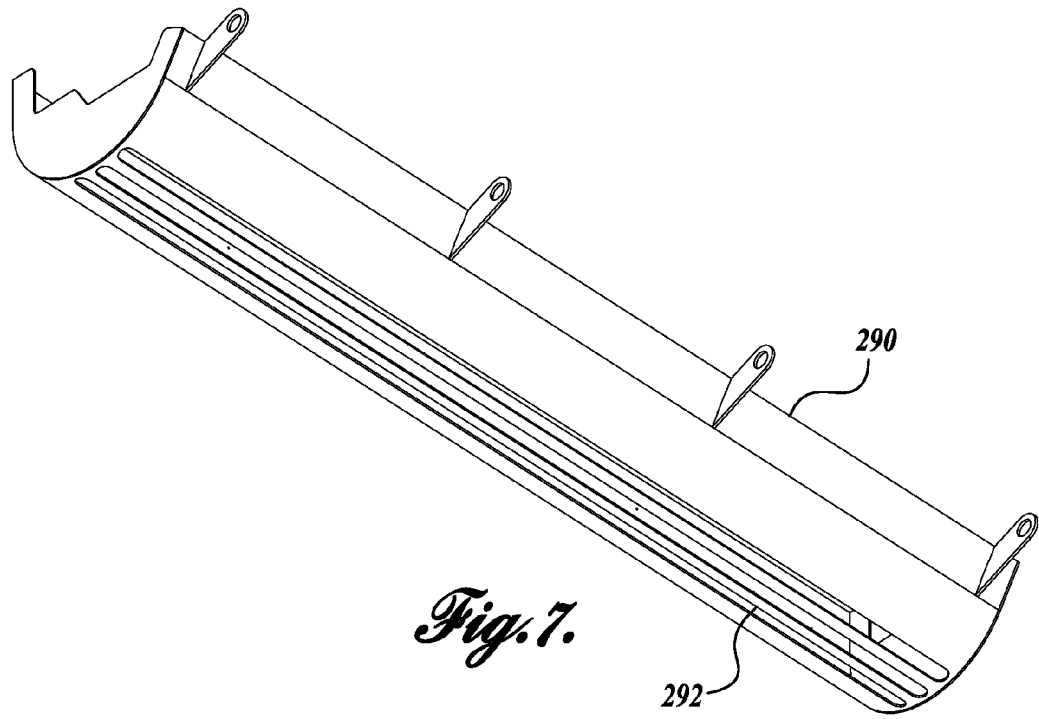
FIGS. 7 and 8 are isometric views of outlet covers configured to mate with the coating distribution roller of the coating system of FIG. 1, wherein the outlet covers are in accordance with other embodiments of the present disclosure.
Figure 8:
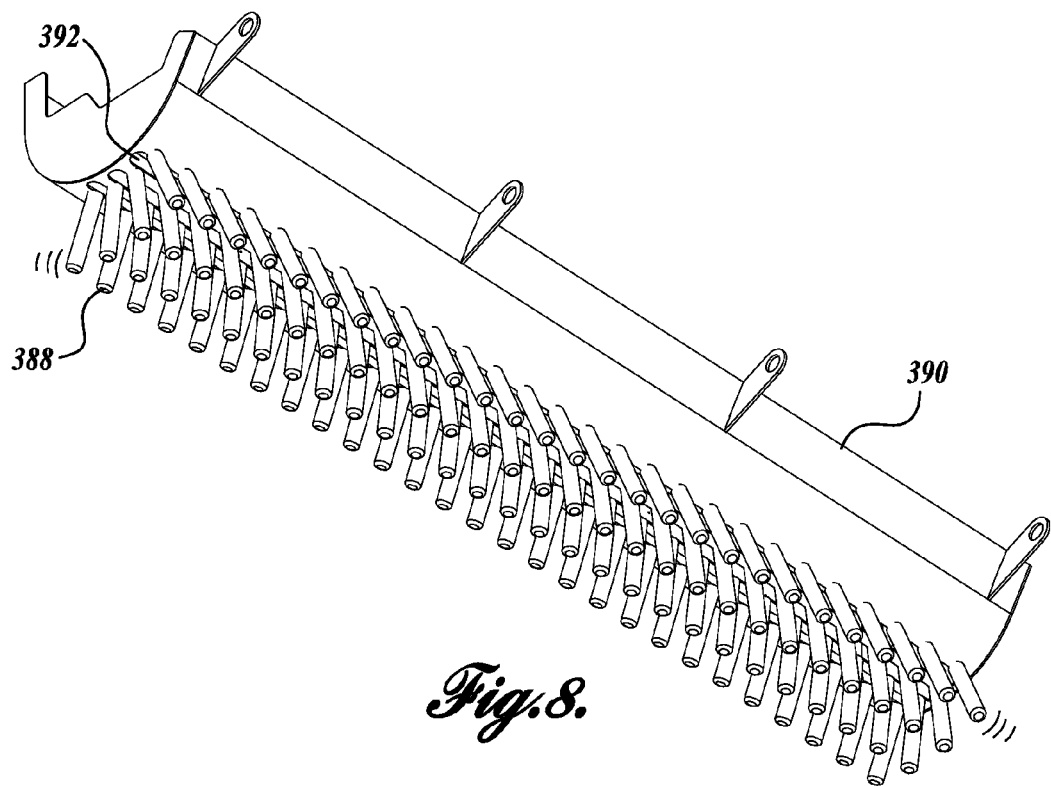

Referring to FIGS. 7 and 8, alternate embodiments of the outlet covers are provided, for example, to replace the outlet cover 90 shown in FIG. 6. As seen in the illustrated embodiment of FIG. 6, the outlet cover 90 includes a plurality of angled slots 92 that converge at the longitudinal midpoint of the cover 90. Referring to FIG. 7, the outlet cover 290 includes a plurality of openings shown as longitudinal slots 292 that extend from the first end to the second end of the cover 290. The longitudinal slots 292 create a linear cascade of coating that is advantageous in certain applications. In this embodiment, a screen 88 (see FIG. 6) may or may not be used to together with the cover 290. If a screen 88 is not used, the longitudinal slots 292 provide a more open path for discharge of the coating material from the hopper chamber 70, as compared to when a screen 88 is used. As described above, it should be appreciated that other opening geometries can be used to create various distribution effects for the discharge of the coating material from the hopper chamber.

When the coating material is very humid, or very sticky, it is prone to forming clumps, bridging, and/or adhering to surfaces in the coating distribution system, which can plug screens and/or openings. Therefore, the screens and openings in the embodiments described above may not be effective to ensure consistent flow of coating material. To help resolve this issue, the apparatuses described below are further designed to break clumps and better disperse the coating material coming out of the hopper chamber 70.

Referring to FIG. 8, the outlet cover 390 includes a plurality of (for example, two or more) of longitudinal slots 392 (similar to the slot 292 in FIG. 7), and also includes a plurality of extensions of fingers 388 that extend from the outer surface of the cover 390 and further assist in breaking up coating material M that tends to form clumps, bridges, or otherwise adhere to itself and other surfaces. Fingers 388 can be made from rubber, plastic, or flexible metallic components, such as a spiral spring. The outlet cover 390 is effective if used in combination with the supplemental rotating roller 394, 494, 594, and 694, described below (see FIGS. 9-12A).

Figure 9:
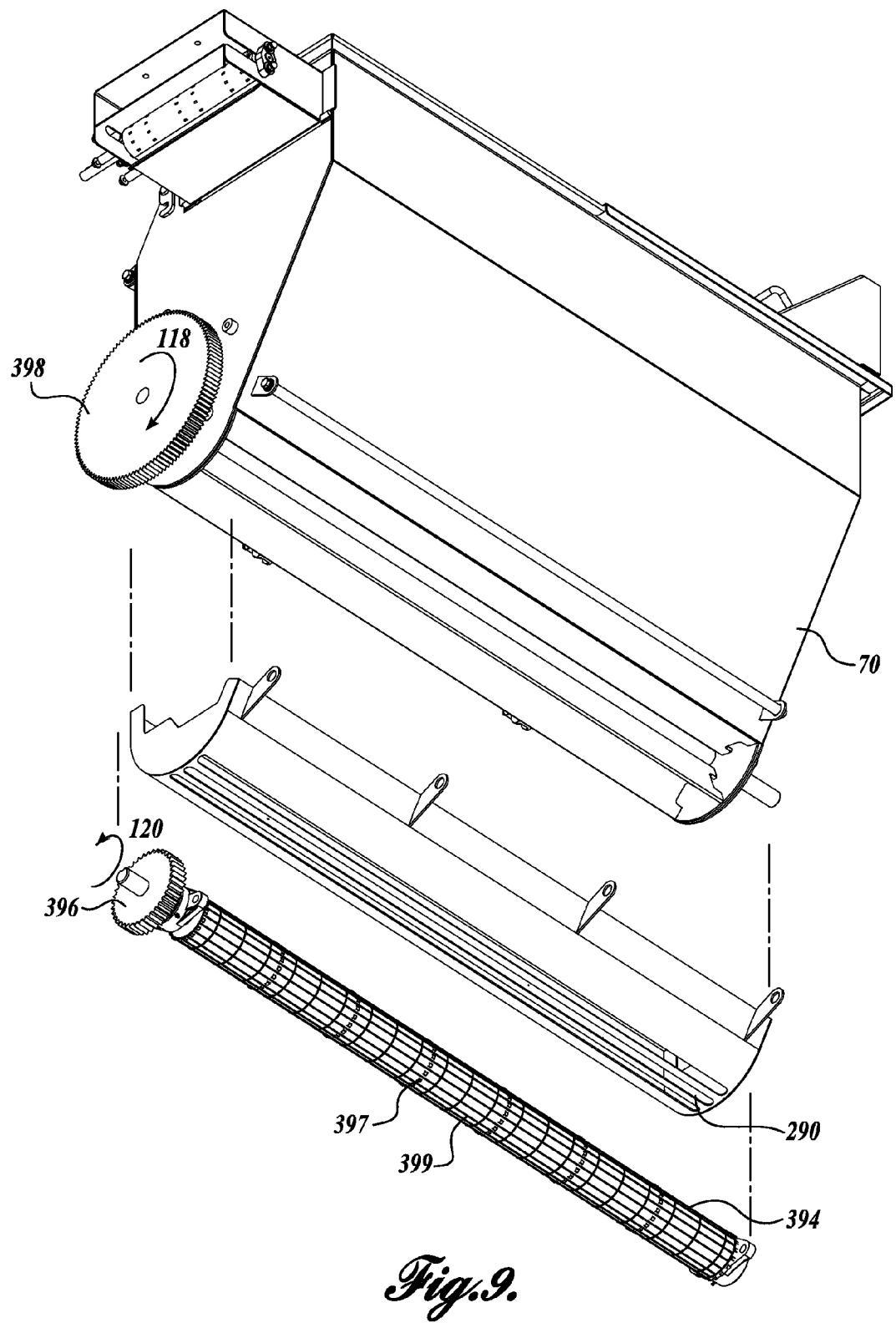
FIGS. 9 and 10 are exploded isometric views of coating distribution assemblies including attachment apparatuses for use in the coating system of FIG. 1, wherein the attachment apparatuses are in accordance with other embodiments of the present disclosure.

Now referring to FIGS. 9-12B, apparatuses or accessories are provided for use with the coating distribution system 24 as described and shown in FIGS. 1-5. Referring to FIG. 9, the coating distribution assembly includes a driven coating distribution roller 74, as described above. The roller 74 may further include a gear attachment 398 that can be used to drive a supplemental roller 394, which also may have its own gear attachment 396, such that the distribution roller 74 and supplemental roller 394 rotate together in opposite directions. By selectively varying the gear ratio between gears 398 and 396, it is possible to alter the rotation speed of roller 394. In that regard, the supplemental roller 394 further imparts mechanical energy and impact to the coating material exiting the hopper chamber 70. The mechanical energy and impact further breaks accumulations, disperses, and pulverizes the coating material creating a more even and homogeneous flow of coating material for the food products.

The supplemental roller 394 may be held in place beneath and parallel to roller 74 by bearings and may be driven by an independent motor or by a motor that drives the coating distribution roller 74. It should be appreciated that the speed of rotation of distribution roller 74 (and therefore also supplemental roller 394), the amount of energy imparted against the falling coating material particles may be varied, achieving discrete control of the particle pulverization level to be achieved.

In the illustrated embodiment of FIG. 9, the supplemental roller 394 includes a shaft, a plurality of sprockets 397 positioned longitudinally on the shaft and an interweaved wire belt 399 (e.g., a pervious belt) that is supported by the sprockets on the shaft. The supplemental roller 394 has been mated with the slotted cover 290 of FIG. 7. However, it should be appreciated that a coating distribution system including a supplemental roller may be configured in many different configurations. Exemplary configurations are provided in FIGS. 10-12A.

Figure 10:
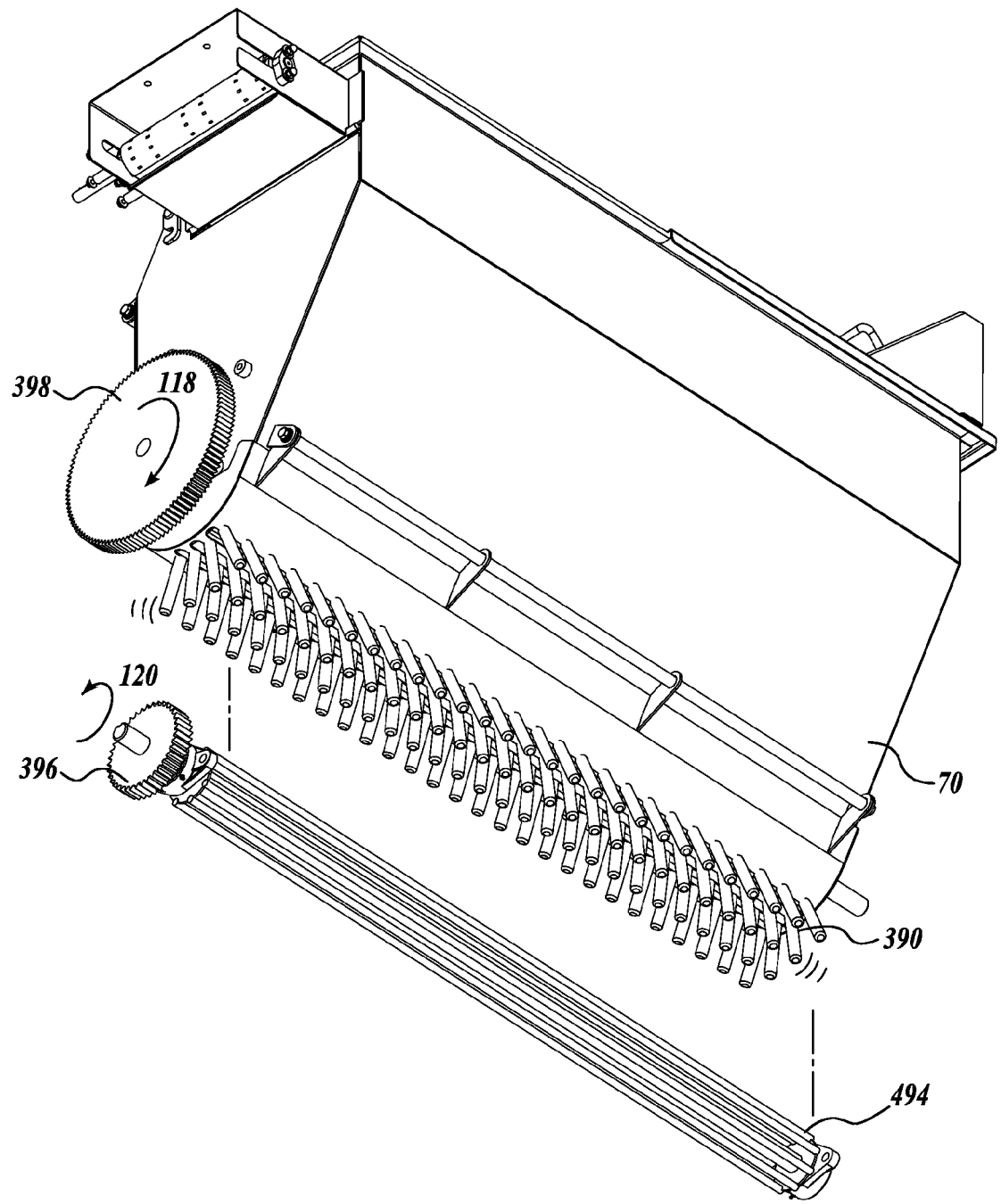

In the illustrated embodiment of FIG. 10, the supplemental roller 494 is made from two gable or end plates, from which stub shafts project outwardly. The plates are connected by a series of round or other shaped rods spaced from each other to cooperatively create a squirrel cage configuration. The gable plates are substantially parallel and the stubs located to be aligned and concentric. A transmission ratio may be selected to achieve the optimum speed of the squirrel cage relative to the other components in the coating distribution system. In the illustrated embodiment of FIG. 10, the squirrel cage supplemental roller 494 has been mated with the finger cover 390 of FIG. 8. In that regard, the rotating squirrel cage supplemental roller 494 contacts the fingers 388 on the finger cover 390 to impart vibration energy to the finger cover 390.

Figure 11:
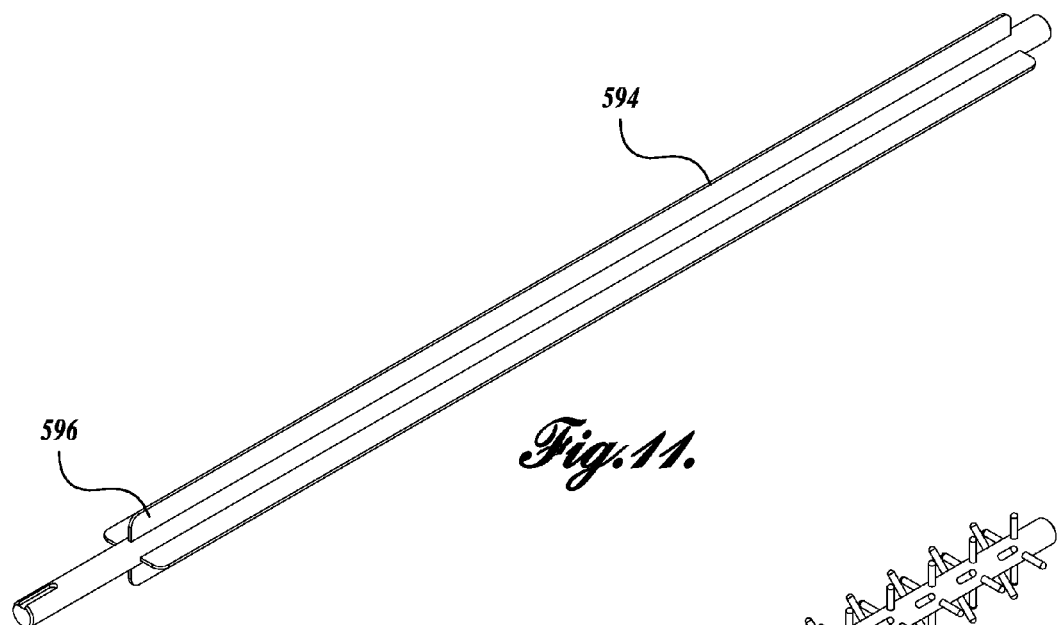
FIG. 11 is an isometric view of an attachment apparatus in accordance with yet another embodiment of the present disclosure.

Referring to FIG. 11, another embodiment of a supplemental roller 594 is provided, wherein the roller 594 includes a plurality of longitudinal fins 596 extending from a central shaft to create a plurality of longitudinal channels.

Figure 12A:
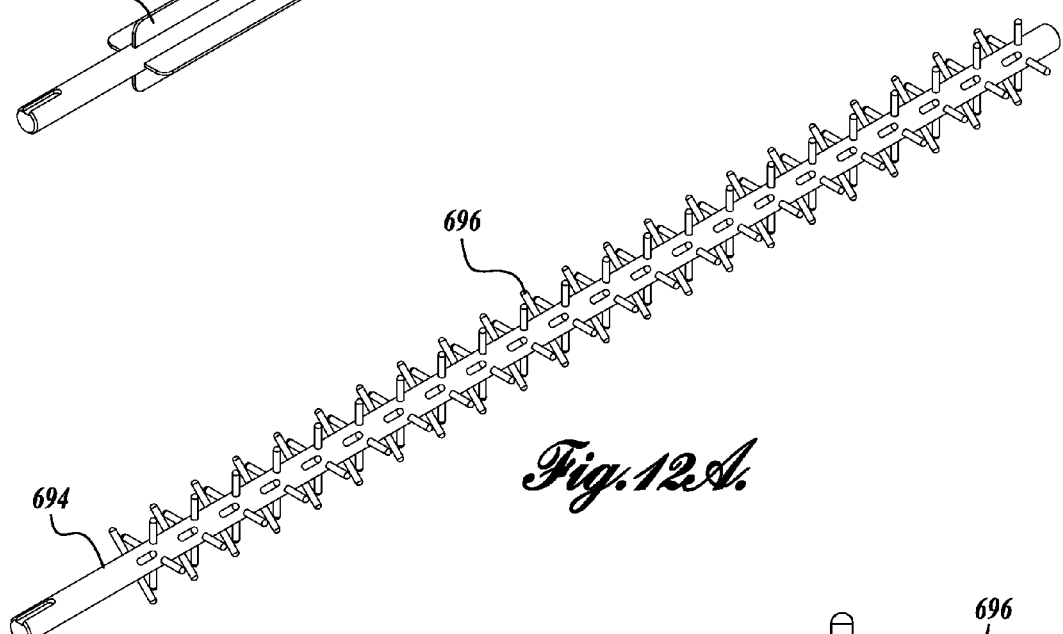
FIGS. 12A and 12B are respective perspective and side views of an attachment apparatus in accordance with yet another embodiment of the present disclosure.
Figure 12B:

Referring to FIGS. 12A and 12B, another embodiment of a supplemental roller 694 is provided, wherein the roller 694 includes a plurality of rigid spokes or fingers 696 mounted radially to the shaft. In another embodiment, the spokes may be articulated spokes that assume a radial position under centrifugal force created by the rotation of the shaft.

Figure 13:
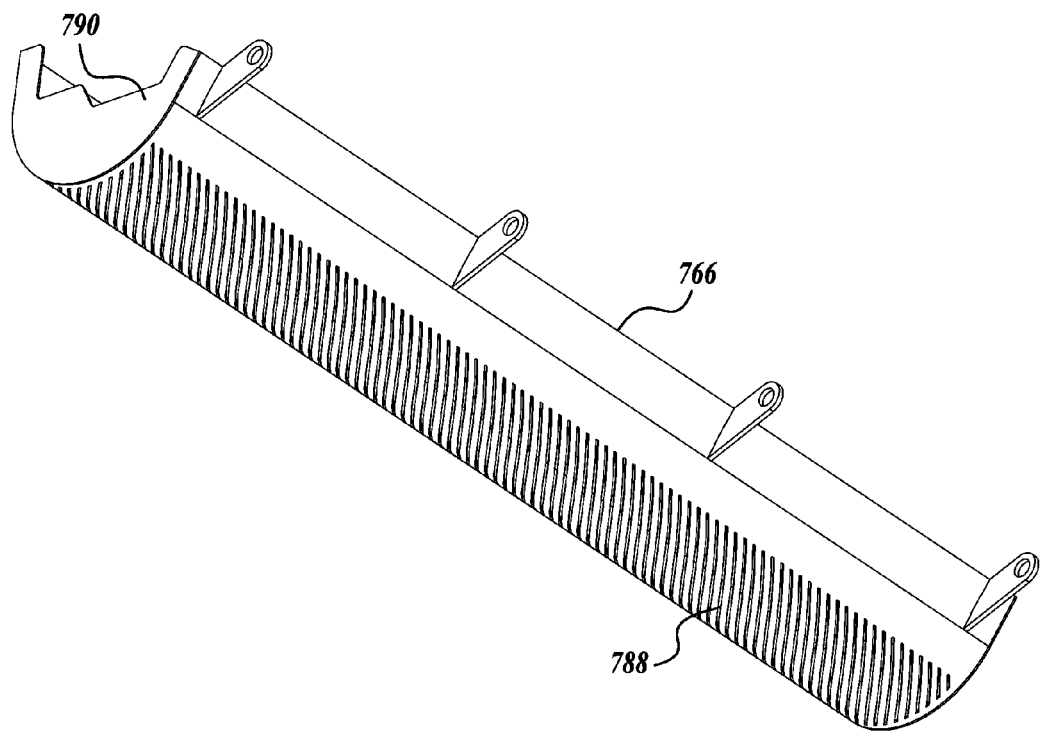
FIG. 13 is an isometric view of a coating distribution assembly in accordance with yet another embodiment of the present disclosure.

Referring to FIG. 13, another embodiment of a sprinkling assembly 766 is provided. In this embodiment, the screen portion 788 and the cover portion 790 are integrated into one part, for example, laser cut from a piece of sheet metal. It should be appreciated that the various embodiments of screens, covers, and supplemental rollers may be mixed and matched depending on the specific coating material application conditions. It should further be appreciated that any of the above-described rotating rollers may have positive contact with the a cover positioned at the bottom of the coating distribution system 24 to generate vibrational energy as a result of the intermittent contact between the parts as the element rotates. These vibrations would further facilitate the flow of coating material as a result of kinetic energy imparted on the particles of coating material that would prevent them from settling and agglomerating with each other and the cover surfaces.

While illustrative embodiments have been illustrated and described, it will be appreciated that various changes can be made therein without departing from the spirit and scope of the disclosure.

The embodiments of the disclosure in which an exclusive property or privilege is claimed are defined as follows:

1. A food coating system, comprising:
   (a) a conveyor system; and
   (b) a coating distribution system positioned to distribute coating material to food products disposed on the conveyor system, wherein the coating distribution system comprises:
      a rotatable coating distribution roller composed of a plurality of longitudinal channels configured to receive coating material therein;
      at least one coating distribution device for distributing the coating material to the food products, the coating distribution device comprising a cover shaped to correspond to the shape of the coating distribution roller, the cover having portions defining a plurality of through holes for the passage of the coating material, and
      wherein the coating distribution roller is configured and positioned whereby the longitudinal channels of the coating distribution roller pass along and drive the coating material across the shaped cover as the coating distribution roller rotates to deliver the coating material to the cover through holes.

2. The system of claim 1, wherein the coating material is in powdered or fine granular form.

3. The system of claim 1, wherein the coating distribution system further includes a container for containing the coating material, the distribution channels receiving the coating material from the container.

4. The system of claim 1, further comprising at least one sifting device disposed upstream from the coating distribution system.

5. The system of claim 4, wherein the at least one sifting device includes a sifting conveyor.

6. The system of claim 1, wherein the plurality of through holes of the cover have a geometry selected from the group consisting of slots, holes, squares, diamonds, and polygonal shapes.

7. The system of claim 6, wherein the at least one coating distribution device includes a plurality of fingers extending outwardly adjacent the plurality of through holes.

8. The system of claim 1, wherein the at least one coating distribution device further includes a vibration device to impose vibrational forces on the coating material being distributed by the distribution device.

9. The system of claim 8, wherein the vibration device includes a configuration selected from the group consisting of a squirrel cage, a pervious belt, and a plurality of spokes.

10. The system of claim 1, further comprising a coating adherence system.

11. The system of claim 1, further comprising an excess coating removal system including at least one of a vibration system and a blow-off system.

12. The system of claim 1, further comprising a coating return system.

13. A food coating system, comprising:
   (a) a conveyor system; and
   (b) a coating distribution system positioned to distribute coating material to food products disposed on the conveyor system, wherein the coating distribution system comprises:
      a coating distribution roller composed of channels extending along the distribution roller for positively carrying and driving the coating material during rotation of the distribution roller for metering the coating material; and
      at least one coating distribution device located below the coating distribution roller for distributing the coating material metered from the coating distribution roller onto the food products, said coating distribution device selected from a group consisting of:
         (1) a screen conforming to the shape of the coating distribution roller and supported by a cover, said cover having a plurality of through holes for the passage of the coating material;
         (2) a cover shaped to correspond to the shape of the coating distribution roller, said cover having portions defining a plurality of through holes for the passage of the coating material;
         (3) a cover formed to correspond to the shape of the coating distribution roller, said cover having portions defining a plurality of through holes for the passage of the coating material, and a plurality of flexible fingers extending outwardly from the formed cover at locations adjacent the plurality of through holes;
         (4) a cover shaped to correspond to the shape of the coating distribution roller, said cover having portions defining a plurality of through holes for the passage of the coating material and a vibration device for imparting vibration forces on the cover;
         (5) a cover formed to correspond to the shape of the coating distribution roller, the cover having portions defining a plurality of through holes therein for the passage of the coating material, a plurality of flexible fingers extending from the cover between the openings formed in the cover, and a vibration device for imparting vibration forces on the flexible fingers; and
         (6) a roller assembly positioned beneath the coating distribution roller to impact the coating material exiting the coating distribution roller.

14. The system of claim 13, wherein the coating distribution system further includes a container from which the coating material is delivered to the coating distribution roller.

15. The system of claim 13, further comprising at least one sifting device for sifting the coating material prior to the coating material reaching the coating distribution roller.

16. The system of claim 15, wherein the at least one sifting device comprises a sifting conveyor.

17. The system of claim 13, wherein the plurality of through holes of the cover have a geometry selected from the group consisting of slots, holes, squares, diamonds, and polygonal shapes.

18. The system of claim 13, wherein the vibration device selected from the group consisting of a squirrel cage, a pervious belt, and a plurality of spokes.

19. The system of claim 13, further comprising a coating adherence system.

20. The system of claim 13, further comprising an excess coating removal system including at least one of a vibration system and a blow-off system.

21. The system of claim 13, further comprising a coating return system.

* * * * *